United States Patent
Bock

(10) Patent No.: US 8,774,323 B2
(45) Date of Patent: Jul. 8, 2014

(54) DEVICE AND METHOD FOR DETERMINING A SYMBOL DURING RECEPTION OF A SIGNAL COUPLED WITH A QUADRATURE SIGNAL PAIR (I,Q) FOR QAM FREQUENCY CONTROL AND/OR ROTATION CONTROL

(75) Inventor: Christian Bock, Freiburg (DE)

(73) Assignee: Entropic Communications, Inc., San Diego, CA (US)

( * ) Notice: Subject to any disclaimer, the term of this patent is extended or adjusted under 35 U.S.C. 154(b) by 1456 days.

(21) Appl. No.: 12/006,092

(22) Filed: Dec. 28, 2007

(65) Prior Publication Data

US 2008/0225992 A1    Sep. 18, 2008

(30) Foreign Application Priority Data

Dec. 29, 2006  (DE) .......................... 10 2006 062 519

(51) Int. Cl.
*H04L 27/06*   (2006.01)
(52) U.S. Cl.
USPC ........................... 375/340; 375/316; 375/322
(58) Field of Classification Search
USPC ............ 375/340, 316, 17, 322, 341, 354, 332
See application file for complete search history.

(56) References Cited

U.S. PATENT DOCUMENTS

| | | | | |
|---|---|---|---|---|
| 4,687,999 | A * | 8/1987 | Desperben et al. | 331/23 |
| 4,809,298 | A * | 2/1989 | Sakane et al. | 375/286 |
| 4,811,363 | A | 3/1989 | Hoffmann | |
| 5,471,508 | A | 11/1995 | Koslov | |
| 5,799,037 | A | 8/1998 | Strolle et al. | |
| 6,215,830 | B1 * | 4/2001 | Temerinac et al. | 375/326 |
| 2001/0017897 | A1 | 8/2001 | Ahn | |
| 2005/0111601 | A1 | 5/2005 | Bock | |
| 2005/0249314 | A1 * | 11/2005 | Bock | 375/322 |
| 2005/0254602 | A1 * | 11/2005 | Bock et al. | 375/332 |
| 2006/0018408 | A1 * | 1/2006 | Bock et al. | 375/322 |

FOREIGN PATENT DOCUMENTS

| | | |
|---|---|---|
| DE | 36 19 744 | 12/1987 |
| DE | 103 44 756 | 5/2005 |
| DE | 103 47 259 | 5/2005 |
| EP | 0200271 B1 | 11/1986 |

(Continued)

OTHER PUBLICATIONS

Ready, M.J. and Richard P. Gooch. "Blind equalization based on radius directed adaption." D11.16, IEEE: 1990. pp. 1699-1702.

(Continued)

*Primary Examiner* — Shuwang Liu
*Assistant Examiner* — Helene Tayong
(74) *Attorney, Agent, or Firm* — Richard Bachand; Duane Morris LLP

(57) ABSTRACT

The invention relates to a device and a method for determining a symbol during reception of a signal coupled with a quadrature signal pair having a discriminator for the determination of a symbol with an analysis of a received signal in complex coordinate space, and a control loop for QAM frequency control and/or rotation control while control parameters are used, which are constructed and/or controlled depending on at least one of the symbols to be decided by the discriminator so that the control parameters are adjusted for decisions to be taken later, wherein one weighting device is constructed and/or controlled, providing in each case one weighting value for the symbols to be decided and/or decided by the discriminator among a plurality of weighting values depending on the symbol position in the complex coordinate space for the control loop.

13 Claims, 4 Drawing Sheets

(56) References Cited

FOREIGN PATENT DOCUMENTS

Figure 1:
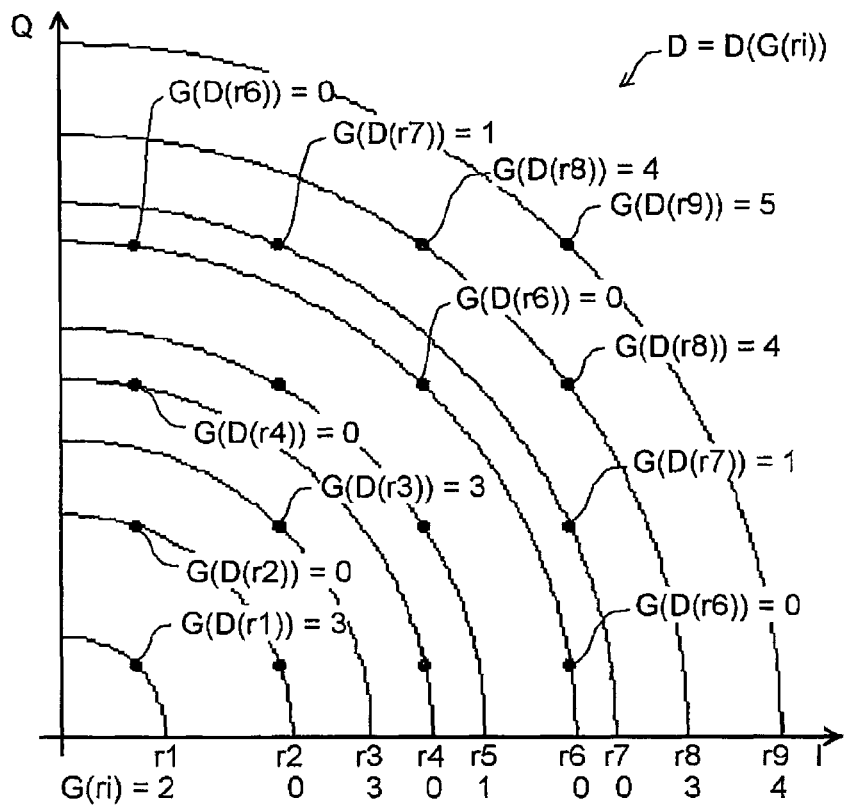

| EP | 0249045 B1 | 12/1987 |
| EP | 0281652 B1 | 9/1988 |
| EP | 0309038 B1 | 3/1989 |

OTHER PUBLICATIONS

Oh, Kil Nam and Jae Hong Park. "Property restoral approach to blind equalization of digital transmission channels." vol. 43. No. 3. IEEE Transactions on Consumer Electronics: 1997. pp. 544-549.

* cited by examiner

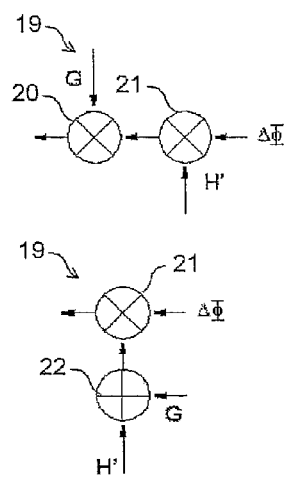
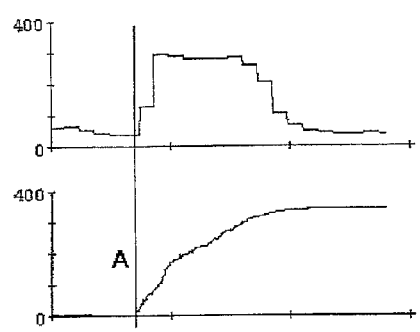
Fig. 7        Fig. 8
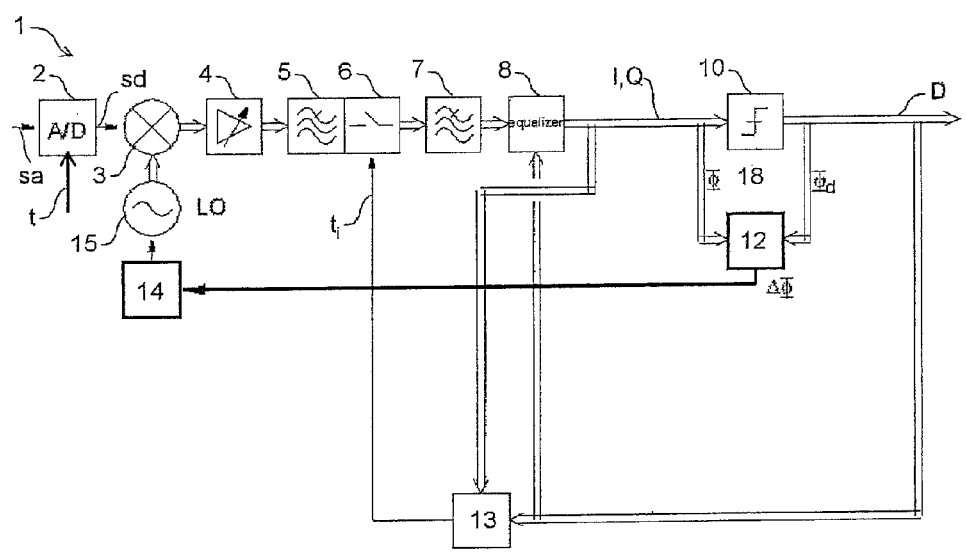
Fig. 9   PRIOR ART

DEVICE AND METHOD FOR DETERMINING A SYMBOL DURING RECEPTION OF A SIGNAL COUPLED WITH A QUADRATURE SIGNAL PAIR (I,Q) FOR QAM FREQUENCY CONTROL AND/OR ROTATION CONTROL

PRIORITY CLAIM

This application claims priority from DE 10 2006 062 591.6 filed Dec. 29, 2006.

FIELD

Various embodiments of the present disclosure relate to telecommunications signal processing generally, and more particularly, to a device and corresponding method for quadrature amplitude modulation (QAM) frequency control and/or rotation control.

BACKGROUND

FIG. 9 shows a demodulator 1 according to the prior art that is used to determine and select symbols D from a digitalized signal sd, which consist of a plurality of individual components and which are coupled with a quadrature signal pair according to a modulation procedure, for instance according to the QAM standard. In the embodiment illustrated in the figure, the demodulator 1 receives at an input an analog signal sa from a signal source. This analog signal sa is supplied to an A/D converter 2 for conversion to a digital signal. In addition, the A/D converter 2 is also equipped with an input for a sampling signal t. The digital signal sd is supplied by the A/D converter 2 to a quadrature converter 3. The quadrature converter 3 converts the digital signal sd in the baseband and outputs digital signal sd which is split into both quadrature signal components of the Cartesian coordinate system. In order to convert the frequency, the quadrature converter 3 is fed two carriers offset by 90° from a local oscillator 15, whose frequency and phase is controlled by a carrier control device 14. The quadrature signal components are supplied from the quadrature converter 3 to an amplification control device 4.

An output signal of the amplification control device 4 is supplied to a filter 5. Both quadrature signal components I, Q are then supplied to a symbol sampling device 6, which is equipped with sampling control. The control of the symbol sampling device 6 is performed through an input to which is supplied sampling signal $t_i$. The symbol sampling device 6 applies a temporal interpolation between the real sampling values at the symbol rate or at a whole number multiple thereof. As an alternative to this, the A/D converter can be controlled with the sampling signal. In this case, the digital signal would be provided already at the symbol rate or a multiple thereof and the sampling device could be eliminated. The output signal of the sampling device 6 is filtered, in particular by means of a Nyquist filter 7, and supplied to an equalizer 8. The equalizer 8 makes available a temporary symbol at its output. Thereafter, adjusted symbols D are formed by a symbol discriminator 10. These symbols D are then furnished to further digital processing devices. Thus, in this manner, the discriminator 10 extracts digital data.

This discriminator 10 is connected to provide discriminator feedback for control of the carrier frequency/phase, the sampling timing, the equalizer. The clock control device 13 generates the sampling signal $t_i$, which is supplied in particular to the symbol sampling device 6 or to the AD converter in the alternative embodiment. In addition, the clock control device 13 supplies a signal to the equalizer 8. The carrier control device 14 applies a phase difference or a phase offset $\Delta\Phi$, which is determined in a rotation control device 12. The phase offset $\Delta\Phi$ is determined between the phase $\Phi$ of the symbol before the discriminator 10 and the phase $\Phi_d$ of the symbol D after the discriminator 10.

This type of a device and method for QAM frequency control provided with a discriminator are known from DE 36 19 744 or DE 103 44 756.

For the transmission of digital signals with QAM, receiver designs using complex downwards mixing into the baseband, as well amplitude control and carrier frequency/carrier phase and sampling control, are typically employed. The detection of the carrier frequency and phase is difficult to achieve with a PLL (phase-locked loop), in particular with high-performance modulations, because mostly erroneous determinations will be carried out during the acquisition phase. The phase offset $\Delta\Phi$ is the angle differential between the sampled and digitalized received signal, and the determined symbol of the alphabet. A frequency offset results in a constant modification of a correctly determined phase offset and can be measured as the difference between successive phase offsets.

A conventional QAM receiver mixes, for example, using a circuit such as the circuit shown in FIG. 9, the signal which is found on a carrier frequency in the baseband and samples it according to timing for symbols, wherein a decision is made after a level adjustment, Nyquist filtering and adaptive filtering have been carried out in an equalizer. The sequence of the functional blocks that is used in this case to carry out the mixing into the baseband, or the sampling with the symbol rate and amplification control, is irrelevant. The mixing into the baseband can be achieved in the analog region before the subsequent complex, or two-channel, A/D conversion, or after the A/D conversion of the intermediate frequencies, and in an alternative, the sampling to symbol points in time can have already been provided by the A/D converter, or, when this converter operates with asynchronous operation on any frequency, with a digital sample conversion, and blocks for amplification control can be added in principle at any stage.

With a simple QAM receiver, the control of the local oscillator must also stabilize the carrier phase.

SUMMARY

When a better QAM receiver is used, the carrier phase is stabilized with an extra rotation using a rotation control signal, which is an estimated angle having the form of a complex multiplication, just before the discriminator carries out the symbol decision. For the control of devices that operate in the coordinate system of the received signal, such as the equalizer 8 or the clock control device 13, the determined symbol D must be rotated back by the angle of the rotation control signal. If the estimated angle does not correspond to the actual angle of rotation of the system of coordinates of the received signal, this will results in a phase offset $\Delta\Phi$ between the phase angle of the received signal and the angle of the determined symbol. The estimated angle of rotation for the imminent symbol decision is obtained from a phase offset filter. In the simplest case, it is a summator which adds the phase offset $\Delta\Phi$ to the actual angle of rotation.

A repeated and constant phase offset $\Delta\Phi$ indicates a frequency offset of the local oscillator and it can be therefore used to control the oscillator. The phase offset $\Delta\Phi$ is usually filtered with a low-pass in a frequency control block.

Such frequency control functions in the state when the system is turned on. In the acquisition phase, however, most of the symbol decisions are erroneous, so that the phase system $\Delta\Phi$ does not always reflect a frequency offset.

Since the early decisions will be in any case mostly erroneous, one embodiment form according to U.S. Pat. No. 5,471,508 is limited to the determination of the thrust points of the quadrants and a "reduced constellation set" is employed, wherein each quadrant will be represented by only one symbol on the angle bisector. Furthermore, a "threshold value" can be set as a threshold for the radius, so that signals received below this threshold values are ignored. The lobe of the quadrant is thus overvalued. Based on statistical results, this method also results in a capture with a higher offset.

While U.S. Pat. No. 5,799,037 uses a similar method, an intermediate step is introduced in this case before the final engagement of control wherein eight instead of four auxiliary symbols are used.

With a simple frequency control provided with a decision feedback, the capture range depends on correct decisions and it is therefore very small. Although the control mechanisms according to U.S. Pat. No. 5,471,508 and U.S. Pat. No. 5,799,037 can provide a theoretical capture range of ±12.5% of the symbol clock, a frequency alias of consecutive symbols rated by $n*\pi/2$ is used above this range, and switching systems are required before a PLL equipped with a decision feedback can provide a stabilization with a smaller frequency error and phase error.

Various embodiments of the present disclosure provide a device, as well as a corresponding method, enabling an alternative QAM frequency control and/or rotation control.

Particularly preferred, therefore, is a device for determining a symbol during reception of a signal coupled with a quadrature signal pair, provided with a discriminator for determination of a symbol using analysis of a received signal in a complex coordinate space, and having a control loop for QAM frequency control and/or rotation control with the application of control parameters, which is constructed and/or controlled depending on at least one of the symbols determined by the discriminator while the control parameters are adapted for later decisions; wherein a weighting values device is constructed and/or controlled, which provides a weighting value for each symbol to be decided and/or decided by the discriminator, supplying a plurality of weighting values depending on the symbol position in a complex coordinate space for the control loop. In other words, the weighting applied with weighting values depends on the concrete positions of the symbols to be determined or of determined symbols.

The weighting values device is preferably constructed and/or controlled so that a phase offset and/or rotation control signal is provided for the weighting value.

A weighting values device is preferably constructed and/or controlled having a weighting value used to apply weighting to a control value for a carrier control device, in particular the phase offset. The weighting values can thus be used as quality counts in order to apply weighting to the phase offset in a frequency offset quality block is such a way that the frequency control of the local oscillator will function already during the acquisition phase of the circuit arrangement in which many erroneous decisions still occur.

An alternative weighting device is preferably constructed and/or controlled as a constituent part of a rotation control device, wherein the weighting value is used to apply weighting to a phase offset. The weighting value is thus used in such a way so as to improve the calculation of an estimated rotation signal, which is calculated as an angle of rotation for an incoming symbol decision.

The weighting device can be optionally used in addition to the generation of the rotation signal as a second weighting device providing an additional weighting value, so that additional weighting is applied in this manner as another, delayed value to the control value, in particular a phase offset for the carrier control device. A delay member can provide delay to a weighting value to generate the additional delay value. The additional weighting value device can be in particular constructed as a constituent part of a phase offset filter.

The weighting values device is preferably constructed and/or controlled so that each symbol is associated with a weighting value from a plurality of weighting values depending on the radius of the symbols in a complex coordinate space.

The weighting value device is preferably constructed and/or controlled so that each symbol is associated with an individual weighting value in a plurality of weighting values depending on the position of the symbol in a complex coordinate space.

Such weighting values can be provided in a simple manner by means of a table which is stored in a memory block, in particular a variable table. In particular, the weighting values can be provided from a table which is designed as a two- or more-dimensional table.

Also preferred is a method for the determination of a symbol during reception of a quadrature signal pair-coupled signal for frequency control and/or rotation control, wherein a determination of a symbol is made by a discriminator while control parameters are applied in a complex coordinate space, and wherein depending on at least one determined symbol, the control parameters are adjusted for later decisions, and respective symbols to be determined and/or determined symbols are provided with a weighting value obtained from a plurality of weighting values depending on the position of the symbol in a complex coordinate space for the control loop. One phase offset and/or one rotation signal is preferably weighted with at least one weighting value. The plurality of weighting values can be provided in a table and each of the various multiple weighting values can be made available for the alphabet of various symbols. The weighting values can be provided in a table so that the weighting values can be matched with the progression of the frequency control synchronization. One phase offset and or one/rotation value can be also weighted with two or more weighting values.

Such a method or such a circuit can be applied in particular to a complex modulation procedure such as QAM. They are utilized mostly by new radio, TV and data services provided by cable and partially also terrestrially.

An embodiment of the invention and different embodiment forms thereof will now be explained based on the enclosed figures. The figures indicate the following:

BACKGROUND

Figure 2:
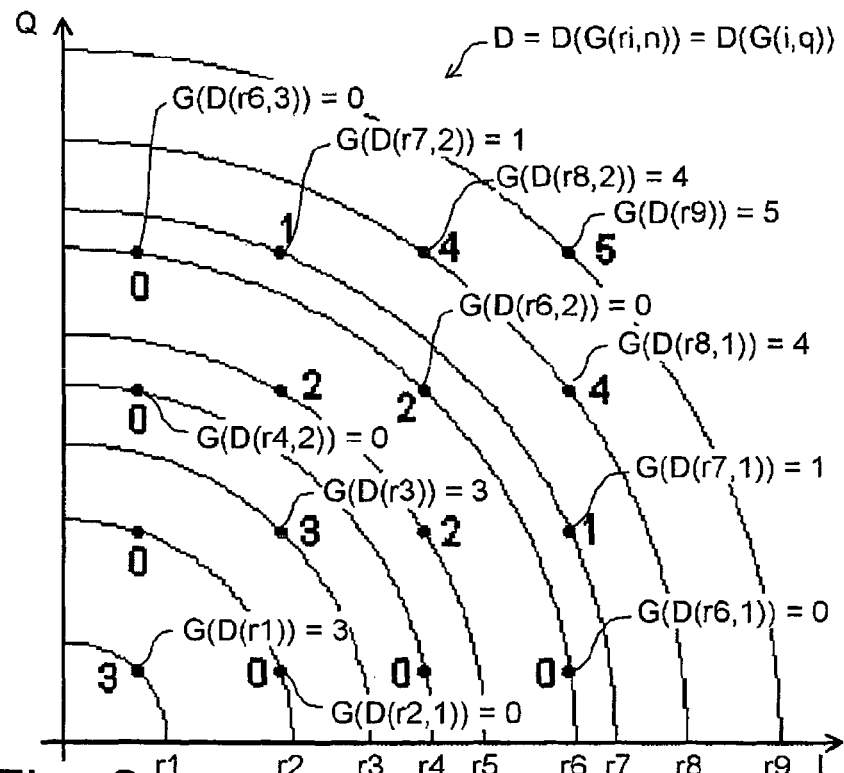
Figure 3:
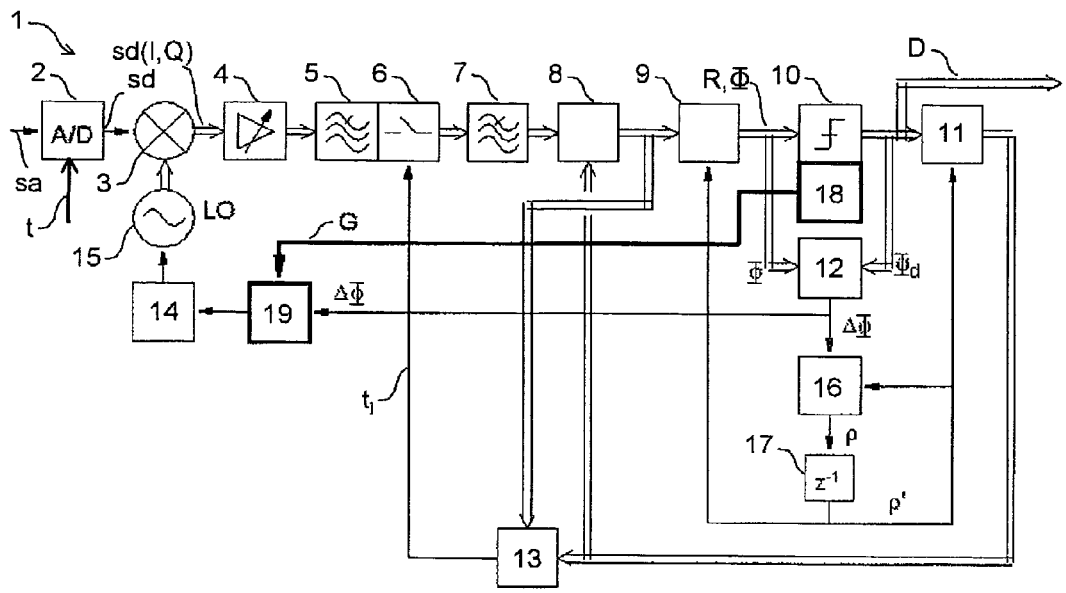
Figure 4:
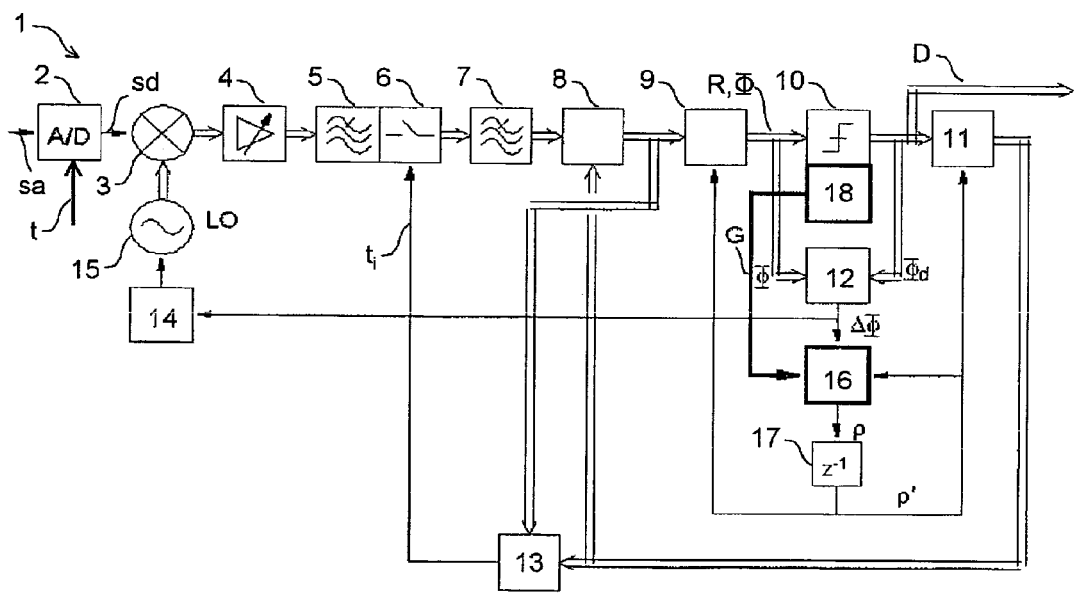
Figure 5:
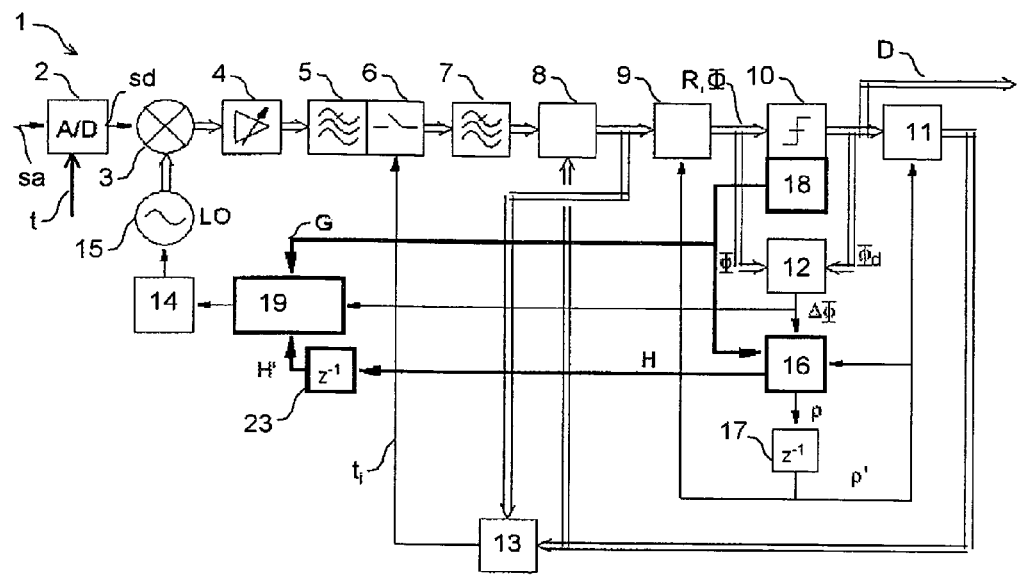
Figure 6:
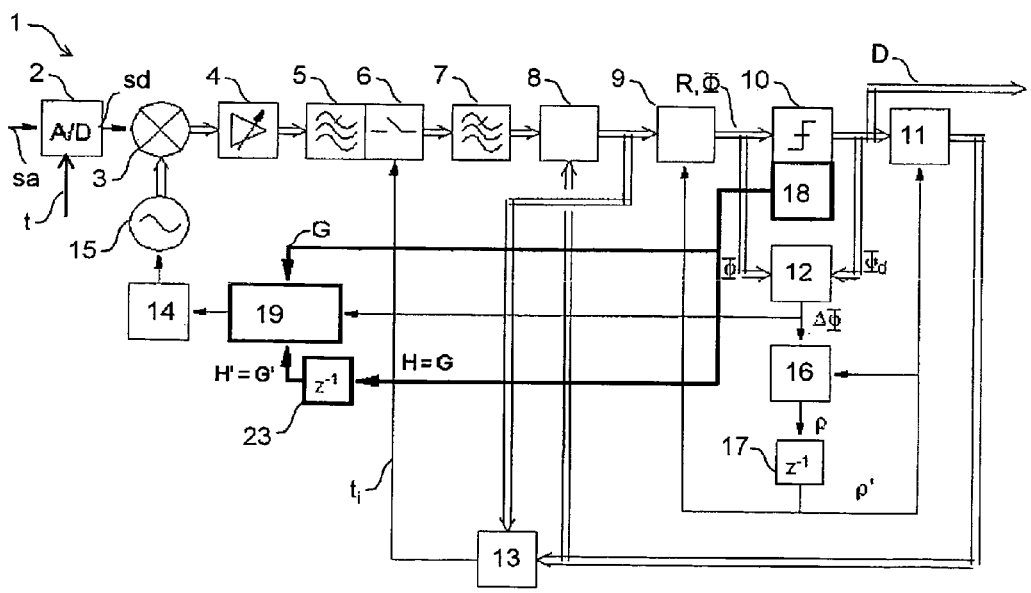

FIG. 1 the symbols of the first quadrant of 64-QAM with an example of radius-dependent weightings associated with the symbols;

FIG. 2 the symbols of the first quadrant of 64-QAM with an example of weightings that are individually associated with all symbols;

FIG. 3 a basic circuit arrangement for a decoder for determining a symbol according to a first embodiment;

FIG. 4 a basic circuit arrangement for a decoder for determining a symbol according to a second embodiment;

FIG. 5 a basic circuit arrangement for a decoder for determining a symbol according to a third embodiment;

FIG. 6 a basic circuit arrangement for a decoder for determining a symbol according to a fourth embodiment;

FIG. 7 two circuit diagrams for linking a control signal value with a weighting value;

FIG. 8 a measured and accumulated absolute phase error and an accumulator of the frequency control; and FIG. 9 a basic circuit arrangement for a decoder for determining a symbol according to prior art.

DETAILED DESCRIPTION

As shown in FIG. 1 and FIG. 2, symbols D of a symbol alphabet are arranged in complex phase space I, Q in a manner that is per se known, on radii r1-r9, wherein a first quadrant is defined as having both axes in the positive region for 64-QAM. The figure thus illustrates the symbols D and possible symbol radii r1-r9 in the first quadrant.

Within the framework of a control loop for QAM frequency control (QAM: Quadrature Amplitude Modulation), the symbols D are determined in a discriminator. Symbol values before and after the discriminator are supplied to the control loop as base values for the determination of the control parameters.

These control parameters are either uniform for all embodiments described below, or the intermediate values for their determination were weighted with weighting values G. This is not applicable to all control parameters, but only partially, to the phase $\phi$ or the angle $\rho$. Each radius r1-r9 and/or each symbol D contains a quality count or is associated with its own weighting value G.

As one can see from FIG. 1, in a simple embodiment, respective radii r1-r9 are assigned or associated with individual weighting values G. The weighting values are thus dependant on the radii ri with i=1-9 weighting values G(ri). Accordingly, the weighting values G, which are associated with individual symbols D, are of the symbols and the radii ri with i=1-9 dependent weighting values G(D(ri)).

It is preferred when radii r2, r4, r6, which are located close to the radii r3, r5, r7, are assigned lower weighting values or the value "0" because symbols at such low-weighted radii r2, r4, r6 can lead to particularly erroneous decisions. Conversely, the radii r1, r3, r8, r9, which are located far from the other radii r2, r4, r6, or which can lead to particularly safe decisions, are assigned high weighting values.

The basic concept here is that each symbol D of the alphabet is assigned a weighting value G, which is a criterion for the likely accuracy of the decision. This quality count is oriented toward the goal of the application, in this case for example towards the accuracy of a measured phase offset.

For a frequency control, the symbols D are preferably in the corners of the constellation, and on the radii that are located far from the neighboring radii, in particular those located on radii which have only one symbol on the angle bisection of the quadrant, or at least no symbols are preferably in the vicinity of the I and Q axes. This makes it possible to provide significantly improved frequency control, in particular, during a decision about the next radii, which is per se known, for example, from DE 36 19 744, or during a decision, which is per se known from DE 103 44 756.

Such radii ri or symbols D having high counts are immune from offsets of the carrier phase and therefore more suitable for prediction, when an even higher frequency offset or phase offset of the carrier is to be expected. This is in particular the case when the conventional rectangular separation is not used, but the separation according to for example DE 103 44 756 is used instead, wherein the radii opposite the angles can be strongly preferred.

The quality counts are obtained with a statistical analysis from possible errors with an offset in the carrier phase and in the sampling phase. The quality counts can be also variable and adjusted according to the progression of the signal acquisition.

As one can see from FIG. 2, the weighting values G can also be determined individually for the individual symbols D independently of assignment to the fixed radii ri. Particularly preferred is an assignment realized according to radii ri and positions n within the radii ri, so that the weighting values G(D(ri, n) are assigned dependent on the individual symbols D and on the radii ri.

As one can see from FIG. 3, a demodulator includes, for example, a circuit arrangement for a determination of and a decision about a symbol D from a digitalized signal sd, wherein a quadrature signal pair is modulated with a plurality of individual components, for example according to a QAM standard. These components can all or individually also form a constituent part of an integrated circuit. In particular, the components described below can be also omitted depending on the purpose of the application, their sequence is exchangeable, or they can be complemented with further components. It is further possible to supply the signal such that the signals comprise real signals, complex signals or individual signal components depending on and according to the purpose of the application and the particular circuit arrangement.

In the embodiment shown in the illustration, the demodulator 1 receives at an input an analog signal sa from a signal source, for example a tuner. This analog signal sa, which is usually supplied in a band-restricted intermediate frequency form, is furnished to an AD converter 2 (AD: Analog/Digital) for conversion to a digital signal sd. In addition, the AD converter is 2 equipped with an input for a clock signal or sampling signal t. The digital signal sd is supplied from the AD converter 2 to a mixer or quadrature converter 3.

The quadrature converter 3 converts the digital or digitalized signal sd to the base band. The base band corresponds to the demodulator 1 and the used modulation method. Accordingly, the quadrature converter generates a digitalized signal sd, which is split into both quadrature signal components I, Q of the Cartesian coordinate system. For the purposes of frequency conversion, the quadrature converter 3 is usually provided two carriers shifted by 90° by a local oscillator 15, whose frequency and phase is controlled by a carrier control device 14. The carrier control device 14 is in particular designed as a frequency control device.

The quadrature signal components I, Q that are generated by the quadrature converter 3 are supplied to an amplification control device 4. The amplification control device 4 is controlled in order to utilize the control range of a symbol discriminator 10 in an optimal manner. An output signal of the amplification control device 4 is supplied, for example, to a band pass filter or to a low pass filter 5, which removes uniform components or interfering upper waves from the digital signal. The quadrature signal components I, Q are supplied before or after amplification through the amplification device 4 to a low pass filter 5, which is used to eliminate interfering upper waves.

The pair of quadrature signals I, Q, amplified and filtered in this manner, or both components I, Q of the quadrature signal are then supplied to a symbol sampling device 6, which is equipped with a sampling control device. The control of the symbol sampling device 6 is realized through an input to which is supplied a sampling signal $t_i$. The symbol sampling points in time for sampling of the sampling signal $t_i$ are oriented during a normal operating state to the symbol rate 1/T and usually also to the exact phase position of the received digital signal sd. The symbol sampling device 6 carries out a temporal interpolation between the real sampling values to the symbol rate or a full number multiple thereof. As an alternative, the symbols can be determined for example already in connection with the sampling of the AD converter. The output signal of the sampling device 6 is filtered by means of a low pass filter 7, which in particular has Nyquist characteristics, and supplied to an equalizer 8. The equalizer 8 removes interfering distortions from both components of the quadrature signal pair I, Q and makes available a temporary symbol at its output.

After that, a symbol discriminator 10 generates so called determined symbols D from the temporary symbols which have been provided in this manner. These symbols D are then furnished to further devices for processing of the digital signals.

The complex value reception signal, which is available after the equalizer 8, is thus conventionally supplied to a symbol discriminator 10, which extracts the digital data. This discriminator 10 is linked according to a preferred embodiment to the decision feedback controls of the carrier frequency/phase recovery (carrier/phase recovery), to the timing of sampling (timing, clock recovery) or the equalizer.

The signal output from the equalizer 8 is supplied to an arrangement of structural elements (12-22) used to determine control parameters, which can be also realized with either a partially or completely integrated design. These control parameters are then supplied directly or indirectly to the decision feedback control circuits or components in the demodulator 1. The signals generated in this manner with the symbols S or with the symbol components R, Φ or other signals, for instance the sampling signal $t_i$, are in particular supplied to the equalizer 8, the amplification control device 4, the carrier control device 14 and the symbol sampling device 6. These control circuits are in this case furnished, depending on the circuit arrangement, the quadrature signal pairs I, Q of the symbol S in either Cartesian coordinates or in polar coordinates. It is also possible to enable, depending on the circuit arrangement, supplying of individual structural elements with only one of the quadrature signal components, for example to supply to the carrier control device 14 the angle of the phase Φ in polar coordinates, and to supply to the amplification control device 4 the radius information or the amplitude information R in polar coordinates.

A coordinate converter is used to provide the polar coordinates R, Φ, and to which is supplied the temporary symbol, or alternatively also the determined symbol D.

FIG. 3 shows the arrangement used to determine the control parameters, comprising a rotation device 9, which, in one possible form of such a coordinate converter, rotates the signal output from the equalizer 8 by a predetermined amount. A rotation control signal ρ' is supplied for this purpose. The rotation control signal ρ' corresponds to an estimated momentary tipping angle between the reception-coordinate system of the received signal and the coordinate system of the circuit arrangement, in particular of the discriminator 10. The rotation control signal ρ' is in this case determined in a rotation control device 12, 16, to which is supplied the output signal of the rotation device 9 and the output signal of the discriminator 10, which is used to maintain control. The discriminator 10 also receives the output signal of the rotation device 9.

The output signal of the discriminator 10 is in addition also furnished to a counter-rotation device 11, which is used to realize rotation in the opposite direction. The counter-rotation device 11 also supplies this rotation control signal to the rotation control device 12, 16. The output signal of the counter-rotation device 11 is supplied to the clock control device 13 and to the equalizer 8.

The clock control device 13 generates the sampling signal $t_i$ which is supplied to the symbol sampling device 6, or in the alternative embodiment to the AD converter 2.

To the clock control device 13 is furnished a base clock from a clock source, which is based on the symbol rate 1/T, or on the symbol duration/symbol period T of the employed modulation method and of the demodulator 1. In addition, the signal of the equalizer 8 is provided to the clock control device 13.

The carrier control device 14 applies a phase difference or a phase offset ΔΦ, which is determined in a first stage 12 of the rotation control device 12, 16. The phase offset ΔΦ is optionally determined as the difference between the phase Φ of the symbols before the discriminator 10 and the phase $Φ_d$ of the symbols D after the discriminator 10.

In a second stage 16 of the rotation control device 12, 16, a rotation signal ρ is determined from the phase offset ΔΦ and from the rotation control signal ρ' using summation or using a method according to DE 103 47 259. The rotation signal ρ is delayed by a delay member 17 by $z^{-1}$ and supplied as the rotation control signal ρ'.

In order to control the clock control device 13 and also the further components of the demodulator 1, these elements are preferably connected to a control device. The control device implements an orderly operating sequence and controls the individual components and operating sequences according to hardware or software-based instructions. The control device can be preferably also partially or fully integrated with the functions of the individually named components.

An essential element in all embodiment is a weighting values device 18, which is used to provide weighting values G for the symbols to be determined by the discriminator 10, or the determined symbols D. The weighting values device 18 for a symbol can be used for a decision from the discriminator 10 or a used symbol D, or can be also constructed as an integral structure part of such a discriminator. A purely software based conversion is also possible.

The weighting values device 18 supplies for each symbol D a weighting value which is assigned to this symbol, or a temporal sequence of such weighting values G. This weighting value G is used for direct or indirect weighting, as well as to control the relevant parameters, in particular for weighting of the phase offset ΔΦ and/or of the rotation control signal ρ'.

As shown in FIG. 3, the weighting value G is input to a first weighting device 19, which is connected between the first stage 12 of the rotation control device 12, 16 on one side, and the carrier control device 14 on the other side. Weighting is performed in the weighting device 19 so as to provide from it output signal values corresponding to the phase offset ΔΦ weighted with the weighting value G. The weighting values G, which serve as quality counts, are thus determined at the same time with the determined symbols D in an additional block which is added to the discriminator 10.

The quality counts can thus be utilized for the weighting of the phase offset ΔΦ in the weighting device 19 or in the frequency offset quality block in such a way that the frequency control of the local oscillator 15 functions already during the acquisition phase of the demodulator 1, in which there are still many erroneous decisions.

The weighting is carried out in the simplest case by multiplying the phase offset ΔΦ with the weighting value G, before performing low-pass filtering of this result in the frequency control block.

As shown in FIG. 4, the weighting value G is input, according to a second embodiment which is also only exemplary, to a second weighting device 16, which is integrated in the rotation control device 12, 16. In particular, the second weighting device 16 is designed with a second stage 16 of the rotation control device 12, 16. In the second stage 16 of the rotation control device 12, 16 is carried out a weighting with the weighting value G in order to provide the rotation signal ρ.

In this embodiment, the quality count or the weighting value G is used so as to improve of the estimated rotation signal ρ, which is used as a rotation angle for the imminent symbol decision. Also in this case, the simplest form of exerting an influence is multiplication, wherein the statistical median value of the weighted value G should preferable be about 1. The result is that the calculation of the estimated rotation signal ρ is influenced with a weighting value G in the phase offset filter.

As shown in FIG. 5, the weighting value G is input according to a third embodiment to a first and a second weighting device 19 and 16. Similar to FIG. 3, the first weighting device 19 is connected between the first stage 12 of the rotation control device 12, 16 on one side, and the carrier control device 14 on the other side. As in FIG. 4, the second weighting device 16 is integrated in the rotation control device 12, 16.

In particular, the second weighting device 16 is designed with the second stage 16 of the rotation control device 12, 16. The second weighting device 16 optionally provides an additional weighting value H, which is input to the first weighting device 19 by means of another delay member 23 with $z^{-1}$ as another delayed weighting value H'. The first weighting device 19 thus applies weighting to the phase offset ΔΦ with two weighting values G, H'.

The quality of the decision made about a symbol D and thus for a phase offset ΔΦ depends not only on the geometrical position of the actual signal, namely of the determined symbol D, but also on the quality of the angle of rotation or of the rotation control signal ρ', which has rotated the input signal in the coordinate system of the discriminator. For this reason, according to this embodiment, not only is the quality or the weighting value G of the determined symbol taken into account, but also the quality or the weighting value H' of the actual coordinate rotation in the form of the actual rotation control ρ'.

The quality G or the weighting value H of the rotation is derived from the quality of the symbol decision in a function of the phase offset filter. This function can be calculated in an analogous manner with the next coordinate rotation, for example with a low pass filter or a median filter.

A symbol quality having the form of the first weighting value G and an actual rotation quality in the form of the second weighting value H' is used in the frequency offset quality block to apply weighting to the phase offset ΔΦ.

As shown in FIG. 6, the weighting value G is input according to a fourth embodiment, which is also only exemplary, to a first weighting device 19. Similar to FIG. 3, the first weighting 19 is connected between the first stage 12 of the rotation control device 12, 16 on one side, and the carrier control device 14 on the other side. In addition, the weighting value G is input via another delay member 23 with $z^{-1}$ as another delayed weighting value H'=G'=G ($z^{-1}$) to the first weighting device 19. The first weighting device 19 thus weights the phase offset ΔΦ, as shown in FIG. 4, again with two weighting values G, H'.

In the simplest case, the phase quality can thus be input both as the quality of the second weighting value H of the rotation of coordinate system and as the phase quality in the form of the first weighting value G.

FIG. 7 shows two examples of circuits used for conversion of the first weighting device 19 in a frequency offset quality block. Both information items, in which the symbol quality is used as the first weighting value G and the actual rotation quality used as the second weighting value H', are applied in the frequency quality block to the weighting of the phase offset ΔΦ. A simple circuit includes a second multiplier 20, 21 which multiplies the phase offset ΔΦ with both qualities or weighting values G, H'. According to another arrangement, both qualities or weighting values G, H' are added in an adder 22. In addition, the phase offset ΔΦ is multiplied in a multiplier 20 with the sum obtained from the adder 22. Other mathematical operations can be also employed.

Furthermore, it is also possible to use a one-dimensional or two-dimensional table which is stored in memory and whose addressing is carried out with both qualities or weighting values G, H', wherein their inputs determine the manner in which the phase offset ΔΦ is to be handled.

The quality table can be designed as a memory element of the weighting values device 18 or it can be linked to it. The quality table is defined for the employed symbol alphabet, for example 256-QAM, 64-QAM.

The quality counts or the weighting values G, H' do not need to be constants; instead, the quality table can be preferably adjusted to the progression of synchronization.

In particular, after an engagement, the neutral elements of the controls can be in particular written into such a table as a factor of a count of "1" so as to neutralize the circuit. Symbols D or radii r, which should not be taken into account during the control process, have as a quality count "0", which is evident for example also from FIGS. 1 and 2.

FIG. 8 indicates in the upper curve the measured and accumulated absolute phase error and in the lower curve the accumulator of the frequency control. At point in time A, a frequency offset of for example 0.1. $f_{symbol}$ is switched on, wherein $f_{symbol}$ represents the symbol frequency.

What is claimed is:

1. A device for determining a symbol during reception of a quadrature signal pair-coupled signal, comprising:
   a discriminator, configured to determine the symbol based on an analysis of a received signal in a complex coordinate space;
   a control loop for at least one of quadrature amplitude modulation (QAM) frequency control and rotation control wherein control parameters are used, the control loop controlled depending on at least one symbol determined by the discriminator to adjust the control parameters for symbol decisions to be made later;
   a weighting values device configured to provide a plurality of weighting values, each weighting value associated with a corresponding symbol determined by the discriminator or to be determined by the discriminator, each weighting value depending on a position of the corresponding symbol in the complex coordinate space;
   a first weighting device configured as a constituent part of a rotation control device to weight a phase offset with a corresponding weighting value;
   a second weighting device configured to apply weighting with one of the plurality of weighting values to a control value for a carrier control device;
   wherein the first weighting device is configured to:
      generate a rotation signal, and
      furnish to the second weighting device an additional weighting value, which is used as another, delayed weighting value to apply additional weighting to the control value.

2. The device according to claim 1, wherein the weighting values device is configured to provide each weighting value for weighting at least one of a phase offset signal and a rotation control signal.

3. The device according to claim 1, wherein the first weighting device is configured to apply weighting with one of the plurality of weighting values to the control value for the carrier control device.

4. The device according to claim 1, wherein the weighting device is configured to assign to each symbol one of the plurality of weighting values depending on a radius of the symbol in the complex coordinate space.

5. The device according to claim 1, wherein the weighting device is configured to assign to each symbol one of the plurality of weighting values depending on the position of the symbol in the complex coordinate space.

6. The device according to claim 1, wherein the weighting values are stored in a memory block as a table.

7. The device according to claim 6, wherein the weighting values can be provided from the table created as a two-dimensional or more-dimensional table.

8. A method for determining a symbol during reception of a quadrature signal pair-coupled signal using at least one of quadrature amplitude modulation (QAM) frequency control and rotation control, the method comprising:
- determining a plurality of symbols using a discriminator based on control parameters;
- adjusting the control parameters depending on at least one determined symbol, for symbol decisions to be made later, and
- providing a weighting value corresponding to each symbol determined by the discriminator or to be determined by the discriminator to generate a plurality of weighting values, each weighting value depending on a position of the corresponding symbol in a complex coordinate space;
- weight a phase offset with a corresponding weighting value with a first weighting device configured as a constituent part of a rotation control device;
- apply weighting with one of the plurality of weighting values to a control value for a carrier control device with a second weighting device;
- wherein the first weighting device is configured to:
  - generate a rotation signal, and
  - furnish to the second weighting device an additional weighting value, which is used as another, delayed weighting value to apply additional weighting to the control value.

9. The method according claim 8, wherein at least one weighting value is used for weighting of at least one of a phase offset signal and a rotation control signal.

10. The method according to claim 8, wherein the plurality of the weighting values are provided in a table and made available for each of a plurality of symbol alphabets.

11. The method according to claim 8, wherein the weighting values are provided in a table such that the weighting values are adjusted to a synchronization progression of a frequency control.

12. The method according to claim 8, wherein one phase offset, one rotation value, or both, is weighted with two or more weighting values.

13. The device according to claim 3, further comprising the second weighting device configured as a constituent part of a rotation control filter.

* * * * *